US006816811B2

(12) United States Patent
Seem

(10) Patent No.: US 6,816,811 B2
(45) Date of Patent: Nov. 9, 2004

(54) METHOD OF INTELLIGENT DATA ANALYSIS TO DETECT ABNORMAL USE OF UTILITIES IN BUILDINGS

(75) Inventor: John E. Seem, Glendale, WI (US)

(73) Assignee: Johnson Controls Technology Company, Plymouth, MI (US)

(*) Notice: Subject to any disclaimer, the term of this patent is extended or adjusted under 35 U.S.C. 154(b) by 246 days.

(21) Appl. No.: 09/910,371

(22) Filed: Jul. 20, 2001

(65) Prior Publication Data

US 2003/0028350 A1 Feb. 6, 2003

Related U.S. Application Data

(63) Continuation-in-part of application No. 09/886,920, filed on Jun. 21, 2001.

(51) Int. Cl.[7] .............................................. G08B 21/00
(52) U.S. Cl. ............................ 702/179; 702/57; 702/60
(58) Field of Search ............................... 702/60, 61, 62, 702/64, 65, 179, 180, 181, 182, 183; 705/412

(56) References Cited

U.S. PATENT DOCUMENTS

| 4,701,698 A | * | 10/1987 | Karlsson et al. ............. 324/116 |
| 4,990,893 A | * | 2/1991 | Kiluk ....................... 340/573.1 |
| 5,555,195 A | * | 9/1996 | Jensen et al. ................ 700/276 |
| 6,424,929 B1 | * | 7/2002 | Dawes ....................... 702/179 |
| 6,643,629 B2 | * | 11/2003 | Ramaswamy et al. ........ 706/45 |
| 2001/0004726 A1 | * | 6/2001 | Lambrecht ..................... 702/5 |
| 2001/0020219 A1 | * | 9/2001 | Kishlock et al. .............. 702/61 |
| 2002/0124001 A1 | * | 9/2002 | Chaudhuri et al. .......... 707/100 |
| 2003/0014205 A1 | * | 1/2003 | Tabor .......................... 702/84 |
| 2003/0061249 A1 | * | 3/2003 | Ramaswamy et al. ...... 708/136 |

FOREIGN PATENT DOCUMENTS

JP 08304120 A * 11/1996 ............ G01D/9/00

OTHER PUBLICATIONS

Carey et al., "Resistant and Test–Based Outlier Rejection: Effects on Gaussian One– and Two–Sample Inference". Technometrics, vol. 39, No. 3. 1999.*
Sematech, "The Engineers Statistics Internet (ESI) Handbook: Grubbs' Test for Outliers." 1999.*
Rosner, "Percentage Points for a Generalized ESD Many–Outiler Procedure" Technometrics, vol. 25, No. 2. May 1983.*
M. Abramowitz et al. *Handbook of Mathematical Functions with Formulas, Graphs, and Mathematical Tables*, Dover Publications, Inc., New York, 1970.
Simonoff, J. S., "A Comparison of Robust Methods and Detection of Outliers Techniques when Estimating a Location Parameter," *Communications in Statistics—Theory and Methods*, pp. 275–285, 1984.
V.J. Carey, et al, "Resistant and Test–Based Outlier Rejection: Effects on Gaussian One– and Two–Sample Inference", *Technometrics*, vol. 39, No. 3, pp. 320–330, Aug. 1997.
R.F. Dodier, et al., "Detecting Whole Building Energy Problems," *ASHRAE Transactions*, vol. 105, part 1, pp. 579–589, 1999.
Janson, M.A. et al., "Robust Methods Applied to Energy–Consumption Data," Decision Sciences, Atlanta, GA, U.S., vol. 16, No. 4, Sep. 1985, pp. 343–356.
Dattero, R. et al., "Methods for the Identification of Data Outliers in Interactive SQL," Journal of Database Administration, IDEA Group Publ., Harrisburg, U.S., vol. 2, No. 1, Dec. 21, 1991, pp. 7–18.
European Search Report, EP 02 25 3130, dated Jul. 18, 2003.

* cited by examiner

*Primary Examiner*—Marc S. Hoff
(74) *Attorney, Agent, or Firm*—Foley & Lardner LLP

(57) ABSTRACT

Outlier identification is employed to detect abnormally high or low energy use in a building. The utility use is measured periodically throughout each day and the measurements are grouped according to days that have similar average utility consumption levels. The data in each group is statistically analyzed using the Generalized Extreme Studentized Deviate (GESD) method. That method identifies outliers which are data samples that vary significantly from the majority of the data. The degree to which each outlier deviates from the remainder of the data indicates the severity of the abnormal utility consumption denoted by that outlier. The resultant outlier information is readily discernable by the building operators in accessing whether the cause of a particular occurrence of abnormal utility usage requires further investigation.

17 Claims, 2 Drawing Sheets

METHOD OF INTELLIGENT DATA ANALYSIS TO DETECT ABNORMAL USE OF UTILITIES IN BUILDINGS

CROSS-REFERENCE TO RELATED APPLICATIONS

This is a continuation in part of U.S. patent application Ser. No. 09/886,920 filed on Jun. 21, 2001.

STATEMENT REGARDING FEDERALLY SPONSORED RESEARCH OR DEVELOPMENT

Not Applicable

BACKGROUND OF THE INVENTION

1. Field of the Invention

The present invention relates managing consumption of utilities, such as electricity, natural gas and water; and more particularly to detecting the occurrence of abnormal usage.

2. Description of the Related Art

Large buildings often incorporate computerized control systems which manage the operation of different subsystems, such that for heating, ventilation and air conditioning. In addition to ensuring that the subsystem performs as desired, the control system operates the associated equipment in as efficiently as possible.

A large entity may have numerous buildings under common management, such as on a university campus or a chain of store located in different cities. To accomplish this, the controllers in each building gather data regarding performance of the building subsystems which data can be analyzed at the central monitoring location.

With the cost of energy increasing, building owners are looking for ways to conserve utility consumption. In addition, the cost of electricity for large consumers may be based on the peak use during a billing period. Thus high consumption of electricity during a single day can affect the rate at which the service is billed during an entire month. In addition, certain preferential rate plans require a customer to reduce consumption upon the request of the utility company, such as on days of large service demand throughout the entire utility distribution system. Failure to comply with the request usually results in stiff monetary penalties which raises the energy cost significantly above that for an unrestricted rate plan. Therefore, a consumer has to analyze the energy usage in order to determine the best rate plan and implement processes to ensure that operation of the facility does not inappropriately cause an increase in utility costs.

In addition, abnormal energy or other utility consumption may indicate malfunctioning equipment or other problems in the building. Therefore, monitoring utility usage and detecting abnormal consumption levels can indicate when maintenance or replacement of the machinery is required.

As a consequence, sensors are being incorporated into building management systems to measure utility usage for the entire building, as well as specific subsystems such as heating, air conditioning and ventilation equipment. These management systems collect and store massive quantities of utility use data, which is overwhelming to the facility operator when attempting to analyze that data in an effort to detect anomalies.

Alarm and warning systems and data visualization programs often are provided to assist in deriving meaningful information from the gathered data. However, human operators must select the thresholds for alarms and warnings, which is a daunting task. If the thresholds are too tight, then numerous false alarms are issued; and if the thresholds are too loose, equipment or system failures can go undetected. The data visualization programs can help building operators detect and diagnose problems, but a large amount of time can be spent detecting problems. Also, the expertise of building operators varies greatly. New or inexperienced operators may have difficulty detecting faults, and the performance of an operator may vary with the time of day or day of the week.

Therefore, there is a need for robust data analysis methods to automatically determine if the current energy use is significantly different than previous energy patterns and, if so, to alert the building operator or mechanics to investigate and correct the problem.

SUMMARY OF THE INVENTION

Abnormal utility usage by a building or a particular apparatus in the building can be determined by repeatedly measuring the level of use of the utility, thereby producing a plurality of utility measurements. A Generalized Extreme Studentized Deviate (GESD) statistical procedure is applied to the plurality of utility measurements to identify any measurement outliers. The measurement outliers denote times when unusual utility consumption occurred, thereby indicating times during which operation of the building or the particular apparatus should be investigated.

In the preferred embodiment, a severity of abnormal utility usage can be established by determining a degree to which the associated outlier deviates from the norm. This can be accomplished by calculating robust estimates of the mean ($\bar{x}_{robust}$) and the standard deviation ($s_{robust}$) of each outlier

DETAILED DESCRIPTION OF THE INVENTION

Figure 1:
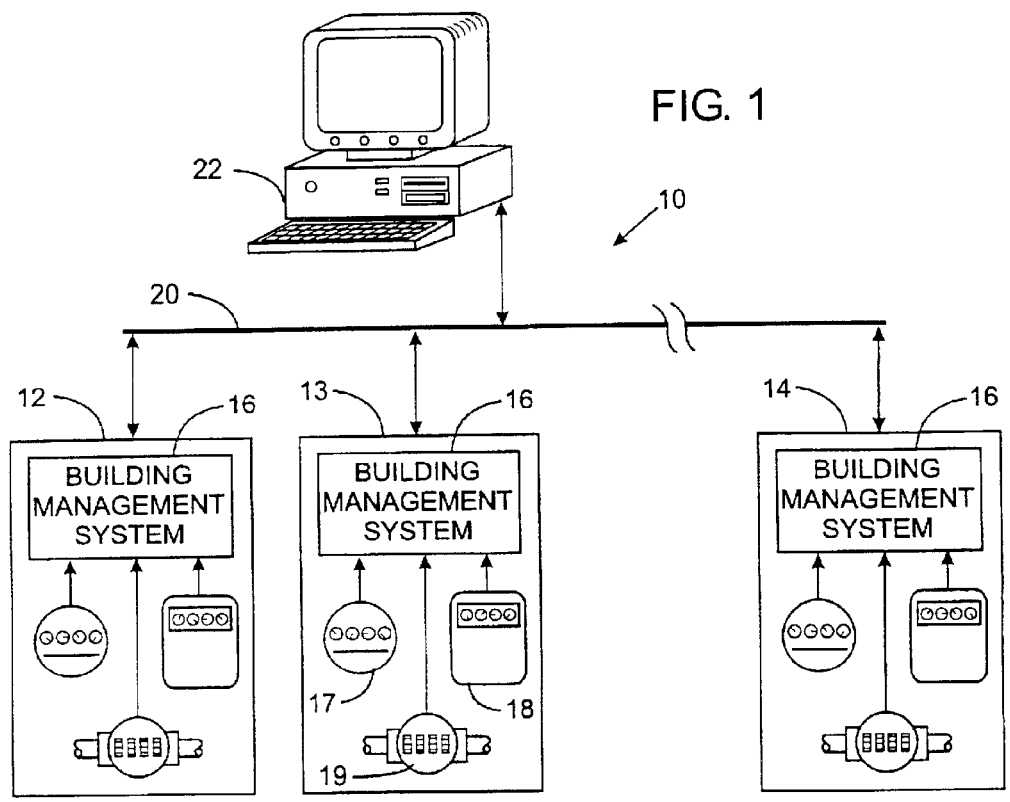
FIG. 1 is a block diagram of a distributed facility management system which incorporates the present invention.

With reference to FIG. 1, a distributed facility management system 10 supervises the operation of systems in a plurality of buildings 12, 13 and 14. Each building contains its own building management system 16 which is a computer that governs the operation of various subsystems within the building. Each building management system 16 also is connected to numerous sensors throughout the building that monitor consumption of different utility services at various points of interest. For example, the building management system 16 in building 13 is connected to a main electric meter 17, the central gas meter 18 and the main water meter 19. In addition, individual meters for electricity, gas, water and other utilities can be attached at the supply connection to specific pieces of equipment to measure their consumption. For example, water drawn into a cooling tower of an air conditioning system may be monitored, as well as the electric consumption of the pumps for that unit.

Periodically the building management system 16 gathers data from the sensors and stores that information in a database contained within the memory of the computer for the building management system. The frequency at which the data is gathered is determined by the operator of the building based on the type of the data and the associated building function. The utility consumption for functions with relatively steady state operation can be sampled less frequently, as compared to equipment with large variations in utility consumption.

The gathered data can analyzed either locally by the building management system 16 or forwarded via a communication link 20 for analysis by a centralized computer 22. For example, the communication link 20 can be a wide area computer network extending among buildings in an office park or a university campus, or the communication link may comprise telephone lines extending between individual stores and the principal office of a large retailer.

The present invention relates to a process by which the data acquired from a given building is analyzed to determine abnormal usages of a particular utility service. This is accomplished by reviewing the data for a given utility service to detect outliers, data samples that vary significantly from the majority of the data. The data related to that service is separated from all the data gathered by the associated building management system. That relevant data then is categorized based on the time periods during which the data was gathered. Utility consumption can vary widely from one day of the week to another. For example, a typical office building has relatively high utility consumption Monday through Friday when most workers are present, and significantly lower consumption on weekends. In contrast, a manufacturing facility that operates seven days a week may have similar utility consumption every day. However, different manufacturing operations may be scheduled on different days of the week, thereby varying the level of utility consumption on a daily basis.

Figure 2:
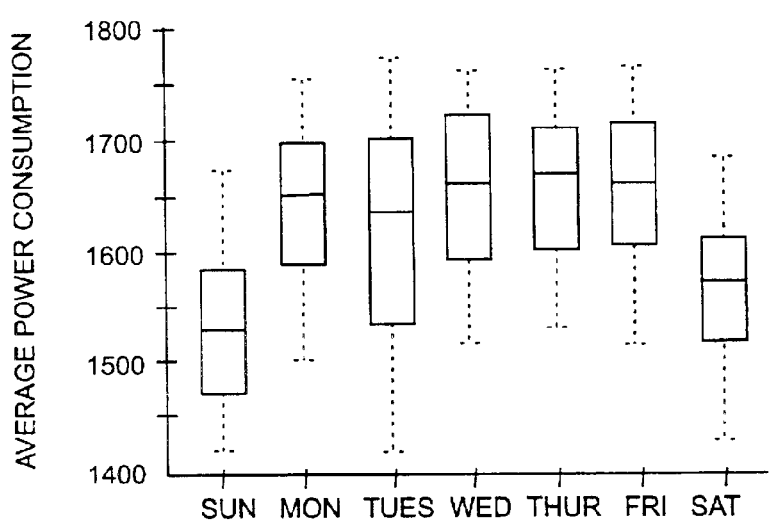
FIG. 2 is a box plot of average electrical power consumption for a building.

Therefore, prior to implementing the outlier analysis, the building operator defines one or more groups of days having similar utility consumption. That grouping can be based on a knowledge of the building use, or from data regarding daily average or peak utility consumption. For example, FIG. 2 is a box plot of the average daily electrical power consumption for an exemplary building. A similar box plot can be generated for the peak electrical power consumption. It is apparent from an examination of this graph that consumption during weekdays (Monday through Friday) is similar, i.e. the normal consumption of electricity falls within one range of levels (A), and weekend periods (Saturday and Sunday) also have similar consumption levels that fall within a second range (B). Therefore, separate utility consumption analyses would be performed on data from two groups of days, weekdays and weekends. However, different day groups would apply to a manufacturing plant in which high utility consuming equipment is run only on Tuesdays, Thursdays and Saturdays. In this latter example, Tuesdays, Thursdays and Saturdays would be placed into one analysis group with the remaining days of the week into a second group.

Figure 3:
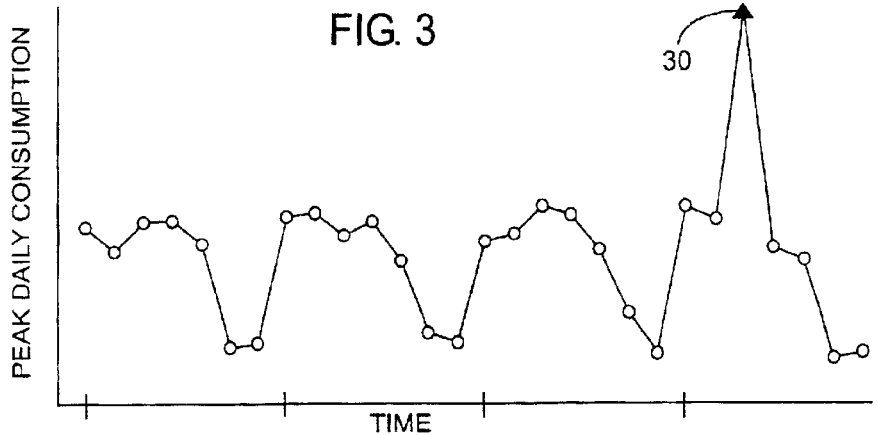
FIG. 3 is a graph depicting the energy consumption for a building.
Figure 4:
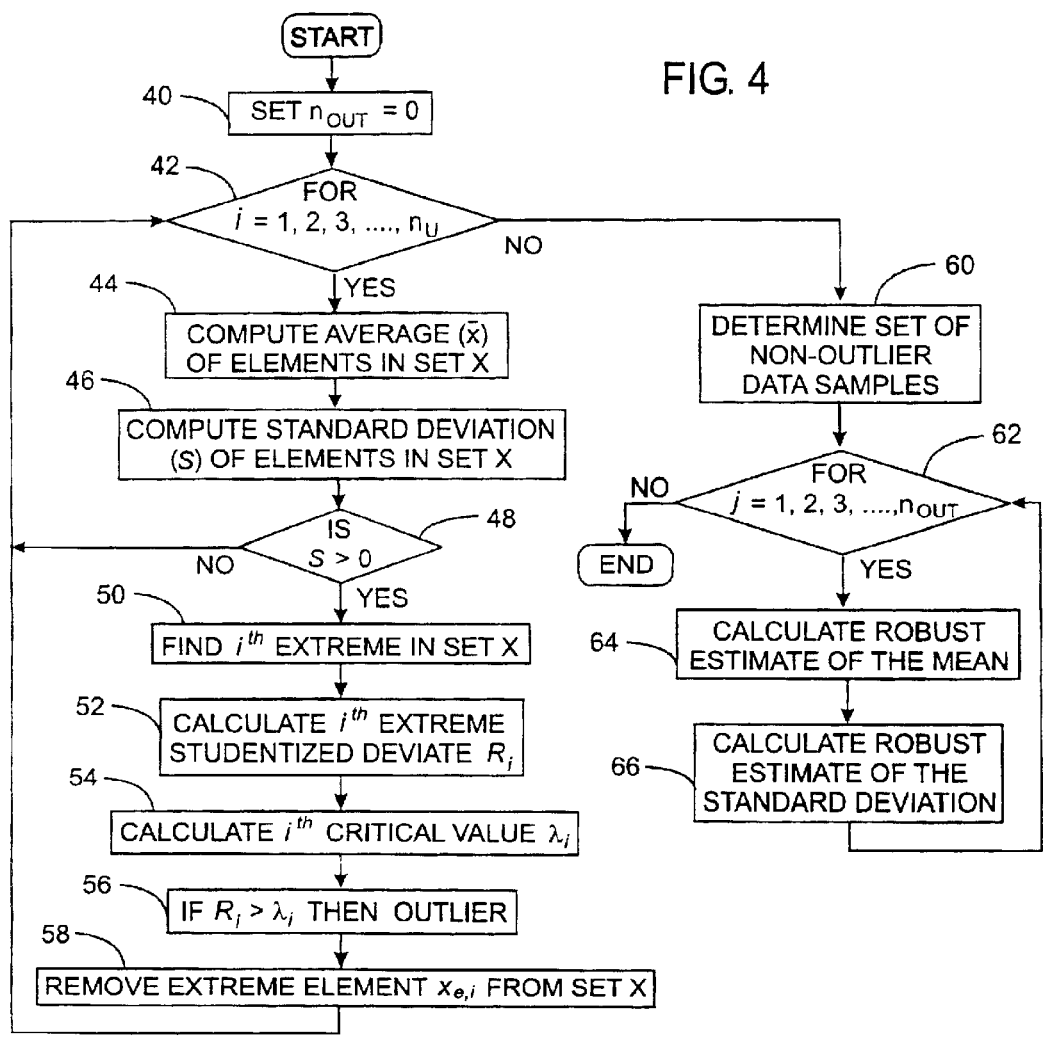
FIG. 4 is a flowchart of the algorithm that analyzes the energy consumption data for the building.

FIG. 3 depicts the peak daily consumption for this building over a period of four weeks. The weekday peaks are significantly greater than the peak consumption on the weekends. Point 30 represents a day when peak consumption of electricity was abnormally high. This may have been caused by a large piece of equipment turning on unexpectedly, for example an additional chiller of an air conditioning system activating on a single very hot day. The data value for this abnormally high level is referred to as an "outlier" and building operators are interested in finding such outliers and learning their cause. Outliers often result from equipment or system control malfunctions which require correction.

The daily usage pattern for each type of utility service can be different. For example, the electricity use in a manufacturing facility may be relatively uniform every day of the week, but a special gas furnace is operated only on certain days of the week. The grouping of days for analyzing electricity use in this facility will be different than the day groups for gas consumption. As a consequence, each utility being monitored is configured and analyzed independently.

Focusing on one type of utility service, such as electricity use for the entire building, acquisition of periodic electric power measurements from the main electric meter 17 produces a set X of n data samples where $X \in \{x_1, x_2, x_3, \ldots, x_n\}$. The analysis will find the elements in set X that are outliers, i.e., statistically significantly different than most of the data samples. This determination uses a form of the Generalized Extreme Studentized Deviate (GESD) statistical procedure described by B. Rosner, in "Percentage Points for a Generalized ESD Many-Outlier Procedure" *Technometrics*, Vol. 25, No. 2, pp. 165–172, May 1983.

Prior to the analysis the user needs to specify the probability of incorrectly declaring one or more outliers when no outliers exist and an upper bound ($n_u$) on the number of potential outliers. The probability defines the sensitivity of the process and is redefined periodically based on the number of false warnings that are produced by the system finding outliers. In other words the probability is adjusted so that the number of outliers found results in an acceptable level of warnings of abnormal utility consumption within the given reporting period, recognizing that false warnings can not be eliminated entirely and still have an effective evaluation technique. The upper bound ($n_u$) specifies a maximum number of data samples in set X that can be considered to be outliers. This number must be less that fifty percent of the total number of data samples, since by definition a majority the data samples can not be outliers, i.e., $n_u \leq 0.5(n-1)$. For example, an upper bound ($n_u$) of thirty percent can be employed for electricity consumption analysis.

The data analysis commences at step 40 by setting the initial value $n_{out}$ for number of outliers to zero. Then at step 42 a FOR loop is defined in which the program execution loops through steps 44–58 processing each data sample specified by the upper bound $n_u$, i.e. samples $x_i$, where i=1, 2, 3, ..., $n_u$. The arithmetic mean ($\bar{x}$) of all the elements in set X is calculated at the first step 44 of this loop. Then at step 46, the standard deviation (s) of the elements in set X is calculated.

If the standard deviation is not greater than zero (s>0), i.e. the samples of utility usage are substantially the same as may occur in rare cases, then the pass through the loop terminates at step 48 by returning to step 42. Otherwise the execution of the algorithm advances to step 50 at which the $i^{th}$ extreme member in set X is located. That extreme element $x_{e,i}$ is the element in set X that is farthest from the mean $\bar{x}$. Using that extreme element $x_{e,i}$ the computer 22 calculates the $i^{th}$ extreme studentized deviate $R_i$ at step 52 according to the expression:

$$R_i = \frac{|x_{e,i} - \bar{x}|}{s} \quad (1)$$

The $i^{th}$ 100α percent critical value $\lambda_i$ then is calculated at step 54 using the equation:

$$\lambda_i = \frac{(n-i)t_{n-i-1,p}}{\sqrt{(n-i+1)(n-i-1+t_{n-i-1,p}^2)}} \quad (2)$$

where $t_{n-i-1,p}$ is the student's t-distribution with (n−i−1) degrees of freedom, and a percentile p is determined from:

$$p = 1 - \left(\frac{\alpha}{2(n-i+1)}\right) \quad (3)$$

Abramowitz and Stegun, *Handbook of Mathematical Functions with Formulas, Graphs, and Mathematical Tables*, Dover Publications, Inc., New York, 1970, provides an process for determining the student's t-distribution $t_{v,p}$ for the $p^{th}$ percentile of a t-distribution with $v$ degrees of freedom. This determination begins by estimating the standardized normal deviate $f$ at the $p^{th}$ percentile, according to:

$$f = \sqrt{\ln\left(\frac{1}{(1-p^2)}\right)} \quad (4)$$

$$z_p \cong f - \left(\frac{2.515517 + 0.802853f + 0.010328f^2}{1 + 1.432788f + 0.189269f^2 + 0.001308f^3}\right) \quad (5)$$

The student's t-distribution $t_{v,p}$ is estimated from $z_p$ and the degrees of freedom $v$ using the following expressions:

$$g_1 = \frac{1}{4}(z_p^3 + z_p) \quad (6)$$

$$g_2 = \frac{1}{96}(5z_p^5 + 16z_p^3 + 3z_p) \quad (7)$$

$$g_3 = \frac{1}{384}(3z_p^7 + 19z_p^5 + 17z_p^3 - 15z_p) \quad (8)$$

$$g_4 = \frac{1}{92160}(79z_p^9 + 776z_p^7 + 1482z_p^5 - 1920z_p^3 - 945z_p) \quad (9)$$

$$t_{v,p} \cong z_p + \frac{g_1}{v} + \frac{g_2}{v^2} + \frac{g_3}{v^3} + \frac{g_4}{v^4} \quad (10)$$

Upon solving equations (1) and (2), if at step 56 the $i^{th}$ extreme studentized deviate $R_i$ is greater than the $i^{th}$ $100\alpha$ percent critical value $\lambda_i$ ($R_i > \lambda_i$), then the $i^{th}$ extreme data sample $x_{e,i}$ is an outlier and the number of outliers equals i.

At step 58, the extreme element $x_{e,i}$ is removed from set X and the number of elements in that set now equals n−i. The algorithm then returns to step 42 to repeat the process and hunt for another outlier. Eventually the set of data samples becomes reduced to the upper bound ($n_u$) at which point the FOR loop terminates by branching to step 60. At that point, the outliers have been identified with a set of outliers given by $X_{out} \in \{x_{e,1}, x_{e,2}, \ldots, x_{e,n_{out}}\}$. If no outliers were found in set X, then $X_{out}$ is an empty set.

After the outliers have been identified a robust estimate of the mean ($\bar{x}_{robust}$) and a standard deviation ($s_{robust}$) for the set of n data samples $X \in \{x_1, x_2, \ldots, x_n\}$ are calculated at steps 62 through 66. In essence this determines how far the outliers deviate from the remainder of the data and thus represents the severity of the abnormal utility consumption denoted by each outlier. The process for making this determination commences with the set of outliers $X_{out}$ and the set ($X_{non-out}$) of the data samples from set X that are not outliers. Specifically:

$$X_{non-out} = \{x | x \in X \text{ and } x \notin X_{out}\} \quad (11)$$

The robust estimate of the mean ($\bar{x}_{robust}$) is the average value of the elements in set $X_{non-out}$ as given by:

$$\bar{x}_{robust} = \frac{\sum_{j=1}^{n-n_{out}} x_j}{n - n_{out}} \quad (12)$$

where $x_j \in X_{non-out}$.

The robust estimate of the standard deviation ($s_{robust}$) is the sample standard deviation of the elements in set $X_{non-out}$ as defined by the expression:

$$s_{robust} = \sqrt{\frac{\sum_{j=1}^{n-n_{out}} (x_j - \bar{x}_{robust})^2}{n - n_{out} - 1}} \quad (13)$$

The robust estimates of the mean ($\bar{x}_{robust}$) and the standard deviation ($s_{robust}$) quantify the severity of the abnormal utility usage represented by the corresponding outlier. These values can be plotted to provide a graphical indication as to that severity by which the building operator is able to determine whether investigation of the cause is warranted.

For days with abnormal energy consumption, the robust estimates of the mean ($\bar{x}_{robust}$) and the standard deviation ($s_{robust}$) are used to determine how different the energy use is from the typical day. One measure is a robust estimate of the number of standard deviations from the average value:

$$z_j = \frac{x_{e,j} - \bar{x}_{robust}}{s_{robust}} \quad (14)$$

where $x_{e,j}$ is the energy consumption for the $j^{th}$ outlier, $\bar{x}_{robust}$ is a robust estimate of the average energy consumption for days of the same day type as outlier j, and $s_{robust}$ is a robust estimate of the standard deviation of energy consumption for days of the same day type.

The operator can be presented with tables or graphs that show the outliers and the amount of variation for the outliers.

What is claimed is:

1. A method for determining abnormal consumption of a utility by a system:

repeatedly measuring a level of use of the utility thereby producing a plurality of utility measurements;

employing a statistical procedure to identify a set of outliers in the plurality of utility measurements;

removing the set of outliers from the plurality of utility measurements to define a set of non-outliers; and evaluating performance of the system in response to the set of outliers and the set of non-outliers by determining a severity of abnormal utility usage represented by each outlier in the set of outliers, wherein determining a severity of abnormal utility usage for each outlier comprises calculating how far each outlier is from a robust estimate value for utility usage determined from the set of non-outliers.

2. The method as recited in claim 1 wherein determining a severity of abnormal utility usage comprises calculating how many standard deviations a given outlier is from the average value for utility usage by using the expression:

$$z_j = \frac{x_{e,j} - \bar{x}_{robust}}{s_{robust}}$$

where $x_{e,j}$ is the energy consumption for the $j^{th}$ outlier, $\bar{x}_{robust}$ is a robust estimate of the average energy consumption for days of the same day type as outlier j, and $S_{robust}$ is a robust estimate of the standard deviation of energy consumption for days of the same day type.

3. The method as recited in claim 1 wherein determining a severity of abnormal utility usage comprises determining an amount that each outlier deviates from a mean of the plurality of utility measurements which are not identified as outliers.

4. The method as recited in claim 1 further comprising separating the plurality of utility measurements into groups wherein each group contains utility measurements acquired during days that under normal conditions have similar utility consumption levels; and wherein the statistical procedure is applied separately to each group.

5. The method as recited in claim 1 further comprising separating the plurality of utility measurements into groups wherein each group contains utility measurements acquired during predefined time periods that under normal conditions have similar utility consumption levels; and wherein the statistical procedure is applied separately to each group.

6. The method as recited in claim 1 wherein the outliers are identified using a Generalized Extreme Studentized Deviate (GESD) statistical procedure.

7. The method as recited in claim 6 wherein the Generalized Extreme Studentized Deviate (GESD) statistical procedure comprises:

(a) calculating an arithmetic mean ($\bar{x}$) of the plurality of utility measurements;

(b) finding an extreme utility measurement $x_{e,i}$ which is the utility measurement that has a value which is farther numerically from the arithmetic mean ($\bar{x}$) than the other ones of the plurality of utility measurements;

(c) using the extreme utility measurement $x_{e,i}$ to calculate an extreme studentized deviate $R_i$;

(d) calculating a 100α percent critical value $\lambda_i$ for the extreme utility measurement $x_{e,i}$;

(e) declaring the extreme utility measurement $x_{e,i}$ to be an outlier when the extreme studentized deviate $R_i$ is greater than the 100α percent critical value $\lambda_i$.

8. The method as recited in claim 7 wherein the Generalized Extreme Studentized Deviate (GESD) statistical procedure further comprises:

removing the extreme utility measurement $x_{e,i}$ from the plurality of utility measurements to form a new plurality of utility measurements; and repeating steps (a) through (e) for the new plurality of utility measurements.

9. The method as recited in claim 7 wherein the extreme studentized deviate $R_i$ is calculated according to the expression:

$$R_i = \frac{|x_{e,i} - \bar{x}|}{s}$$

where s is a standard deviation of the plurality of utility measurements.

10. The method as recited in claim 7 wherein the 100α percent critical value $\lambda_i$ then is calculated using the equation:

$$\lambda_i = \frac{(n-i)t_{n-i-1,p}}{\sqrt{(n-i+1)(n-i-1+t_{n-i-1,p}^2)}}$$

where n is the number of utility measurements, i is a number identifying a particular outlier being evaluated, $t_{n-i-1,p}$ is a student's t-distribution with (n−i−1) degrees of freedom, and p is a value based on the user defined probability α of incorrectly declaring one or more outliers when no outliers exist.

11. The method as recited in claim 10 wherein the percentile p is determined from:

$$p = 1 - \left(\frac{\alpha}{2(n-i+1)}\right).$$

12. A method for determining abnormal consumption of a utility by a system, comprising:

(a) repeatedly measuring the level of use of the utility, thereby producing a plurality of utility measurements;

(b) forming a group of those of the plurality of utility measurements taken during predefined periods of time;

(c) calculating an arithmetic mean ($\bar{x}$) of the group;

(d) finding an extreme utility measurement $x_{e,i}$ which is the utility measurement having a value that is farthest numerically from the arithmetic mean ($\bar{x}$);

(e) using the extreme utility measurement $x_{e,i}$ to calculate an extreme studentized deviate $R_i$;

(f) calculating a 100α percent critical value $\lambda_i$ for the extreme utility measurement $x_{e,i}$;

(g) declaring the extreme utility measurement $x_{e,i}$ to be an outlier indicative of abnormal utility use and adding the outlier to a set of outliers when the extreme studentized deviate is greater than the 100α percent critical value;

(h) removing the extreme utility measurement $x_{e,i}$ from the group of utility measurements;

(i) repeating steps (c) through (h) a defined number of times;

(j) removing the set of outliers from the group of utility measurements to define a set of non-outliers; and (k) evaluating performance of the system in response to the set of outliers and the set of non-outliers by determining a severity of abnormal utility usage represented by each outlier, wherein determining a severity of abnormal utility usage for each outlier comprises calculating how far each outlier is from a robust estimate value for utility usage determined from the set of non-outliers.

13. The method as recited in claim 12 wherein the extreme studentized deviate $R_i$ is calculated according to the expression:

$$R_i = \frac{|x_{e,i} - \bar{x}|}{s}$$

where s is a standard deviation of the utility measurements in the group.

14. The method as recited in claim 12 wherein the 100α percent critical value $\lambda_i$ is calculated using the equation:

$$\lambda_i = \frac{(n-i)t_{n-i-1,p}}{\sqrt{(n-i+1)(n-i-1+t^2_{n-i-1,p})}}$$

where n is the number of utility measurements, i is a number identifying a particular outlier being evaluated, $t_{n-i-1,p}$ is the student's t-distribution with (n−i−1) degrees of freedom, and p is a value based on the user defined probability α of incorrectly declaring one or more outliers when no outliers exist.

15. The method as recited in claim 14 wherein the percentile p is determined from:

$$p = 1 - \frac{\alpha}{2(n-i+1)}.$$

16. The method as recited in claim 12 further comprising defining periods of time during a plurality of days in which under normal conditions similar utility consumption levels occur during each one of those periods of time.

17. The method as recited in claim 12 further comprising performing maintenance on the system in response to examination of one or more of the outliers.

* * * * *